United States Patent [19]

Hyche et al.

[11] Patent Number: 4,960,644

[45] Date of Patent: Oct. 2, 1990

[54] AQUEOUS ADDITIVE SYSTEMS, METHODS AND POLYMERIC PARTICLES

[75] Inventors: Kenneth W. Hyche; William C. Gose, both of Kingsport, Tenn.

[73] Assignee: Eastman Kodak Company, Rochester, N.Y.

[21] Appl. No.: 364,758

[22] Filed: Jul. 12, 1989

Related U.S. Application Data

[60] Division of Ser. No. 97,026, Sep. 16, 1987, Pat. No. 4,880,470, and a continuation-in-part of Ser. No. 701,888, Feb. 15, 1985, abandoned.

[51] Int. Cl.$^5$ ............................ B32B 5/16; B32B 9/00
[52] U.S. Cl. .................................... 428/407; 106/271; 427/222
[58] Field of Search ........................ 106/271; 427/222; 428/407; 524/276, 277, 487

[56] References Cited

U.S. PATENT DOCUMENTS 3,779,785  12/1973  Stiles et al. .......................... 427/222
4,040,996  8/1977   Van Vonno ...................... 427/222 X
4,880,470  11/1989  Hyche et al. ......................... 106/271

FOREIGN PATENT DOCUMENTS 1025280  4/1966  United Kingdom ................ 427/222

Primary Examiner—Michael Lusignan
Attorney, Agent, or Firm—S. E. Reiter; Mark A. Montgomery; William P. Heath, Jr.

[57] ABSTRACT

Aqueous application systems for applying additives to polymeric particles, methods of preparing aqueous emulsions which include additives having a high melting point, additives having a low melting point and an emulsifiable wax. Also disclosed are methods of applying additives to polymeric particles and to polymeric particles treated by such methods.

6 Claims, No Drawings

AQUEOUS ADDITIVE SYSTEMS, METHODS AND POLYMERIC PARTICLES

This application is a divisional of copending application Ser. No. 07/097,026, filed Sept. 16, 1987, now U.S. Pat. No. 4,880,470, patented Nov. 14, 1989, and is a continuation in part of copending application Ser. No. 06/701,888, filed Feb. 15, 1985, now abandoned.

TECHNICAL FIELD

This invention relates to aqueous application systems for applying additives to polymeric particles and methods of preparing aqueous emulsions which include additives having a high melting point, additives which have a low melting point and an emulsifiable wax. The invention further relates to methods of applying additives to polymeric particles and to polymeric particles treated by such methods.

BACKGROUND OF THE INVENTION

Known methods of introducing additives to polymeric particles include dry blending the materials, melting, and compounding the melted blend with extruders and pelletizing or powdering to the desired physical form. The additives include antioxidants, processing aids, slip agents, antiblocking agents, antistatic agents, lubricants, UV stabilizers, coupling agents and colorants.

Another method of introducing additives to polymeric particles is at the extruder hopper during end use processing. Additives such as colorants, slip agents, processing aids, blowing agents, and others are introduced to virgin polymeric particles at this stage usually in concentrate form. In many instances, difficulty is encountered in metering the exact amounts necessary to do a specific job. This is especially true for additives such as processing aids and external lubricants which are used at very low levels and usually cannot be added in a concentrate form.

SUMMARY OF THE INVENTION

Some polymers are presently being manufactured with technology that does not lend itself to melt compounding and pelletizing. Many polymers such as high density polyethylene, linear low density polyethylene, and polypropylene emerge from the polymerization reactor in a dry granular form, similar to a fluidized bed system. Presently, additives for these polymers must be introduced by melting, compounding, and then pelletizing. This extra step increases the cost of such polymer manufacturing operations and can adversely effect the properties of such polymers.

Additives, such as antioxidant or thermal stabilizers, colorants or the like can be incorporated into the aqueous emulsified or dispersed systems of this invention. The aqueous emulsions or dispersions can be used as a spray, wipe, or dip system to coat the polymeric particles before normal drying or degasing operations. Such aqueous systems may be formulated to treat polymeric particles which can then be formed into materials made from such particles. The resulting materials may be used in applications such as film or packaging for food, medicine and the like. Also, such aqueous systems may contain lubricants, mold release agents, antistatic agents and the like.

Polymers which emerge from the polymerization reactor in particle form would substantially benefit from the application of such aqueous emulsions containing antioxidants and other additives by means of such an aqueous treatment. This means of introducing additives would eliminate melt compounding, lower production energy requirements, and minimize heat history on the polymer particles.

DESCRIPTION OF THE INVENTION

The present invention concerns aqueous application systems for applying additives to polymeric particles, the system being characterized by freedom from in situ formation of color producing complexes, said system comprising about 2 to about 10 percent by weight of a surfactant, about 5 to about 20 percent by weight of an emulsified wax, about 0.2 to about 1.0 percent by weight of a base with a pH in the range of greater than 7 to equal to or less than 10.5, about 20 to about 60 percent by weight of at least one additive capable of forming color producing complexes, and about 40 to about 60 percent by weight of water. The base may be selected from sodium tetraborate, sodium carbonate, sodium bicarbonate, calcium carbonate or magnesium carbonate. The additives may be selected from tetrakis[methylene 3-(3',5'-di-tert-butyl-4'-hydroxyphenyl)-propionate]methane, octadecyl 3-(3',5'-di-t-butyl-4-hydroxyphenyl)-propionate, 1,3,5-trimethyl-2,4,6-tris-(3,5-di-tert-butyl)-4-hydroxybenzyl)benzene, bis(2,4-di-t-butylphenyl) pentaerythritol diphosphite, tris(mono nonylphenyl)phosphite, 4,4'-butylidene-bis(5-methyl-2-t-butyl)phenol, tris(3,5-di-t-butyl-4-hydroxybenzyl)isocyanurate, or 2,2,6,6-tetramethyl-4-piperidinyl sebacate.

The invention also concerns methods of preparing aqueous emulsions which include an emulsifiable wax, a first additive component which has a melting point of 100° C. or less and a second additive component which has a melting point greater than 100° C., said method comprising (1) mixing, by weight, about 40 to about 65 percent water, about 12 to about 20 percent of said first additive component, about 4 to about 12 percent of said second additive component, about 5 to about 20 percent of an emulsifiable wax, about 0.2 to about 1.0 percent of a base, and about 2 to about 10 percent of a surfactant; (2) while agitating the mixture, raise temperature of mixture sufficient to melt all solids; (3) subsequently adding more water at a temperature of at least 85° C. in an amount to yield at least 25% solids; (4) then reheating the mixture to a temperature sufficient to maintain the solids in a molten state; (5) maintaining the heated mixture at said temperature and under pressure sufficient to prevent boiling for a period of time to ensure homogeneity; (6) cooling said emulsion to ambient temperature.

The base preferably has a pH in the range of greater than 7 to equal to or less than 10.5 and preferably is selected from sodium tetraborate, sodium carbonate, sodium bicarbonate, calcium carbonate or magnesium carbonate. The first additive component is preferably selected from octadecyl 3-(3',5'-di-t-butyl-4-hydroxyphenyl)propionate or dilauryl thiodipropionate and the second additive component is preferably selected from tetrakis[methylene 3-(3',5'-di-tert-butyl-4'-hydroxyphenyl)propionate]methane, 1,3,5-trimethyl-2,4,6-tris(3,5-di-tert-butyl)-4-hydroxy-benzyl)benzene or bis(2,4-di-t-butylphenyl) pentaerythritol diphosphite, tris(mono-nonylphenyl)phosphite or 4,4'-butylidene-bis(5-methyl-2-t-butyl)phenol.

The invention also includes methods of applying additives to polymeric particles, the method comprising contacting the particles with emulsions disclosed herein and subsequently drying the particles to leave the solids adhering to the particles. The invention includes polymeric particles prepared by the methods disclosed in this specification.

The present invention also involves a method for preparing multicomponent aqueous dispersions useful for treating polymeric particles. It further provides a means of readily incorporating high melting components into aqueous emulsified or dispersed systems. Single component systems of high melting additives are difficult to prepare. For example, tetrakis[methylene 3-(3′,5′-di-tert-butyl-4′-hydroxyphenyl)propionate]methane with a melting point of 110°–125° C. cannot be emulsified in a single additive system. However, when used in a coemulsion with dilauryl thiodipropionate (melting point 40° C.), a stable emulsion is formed. Bis(2,4-di-t-butylphenyl) pentaerythritol diphosphite, a hindered phenolic phosphite with a melting range of 160°–175° C. cannot be emulsified in a single additive system. However, it can be used in a two- or three-component system with lower melting additives such as dilauryl thiodipropionate and octadecyl 3-(3′,5′-di-t-butyl-4-hydroxyphenyl)propionate (melting point 50° C.).

Aqueous emulsions or dispersions containing potassium hydroxide or sodium hydroxide, and additives such as stabilizers for polymeric particles, may cause the formation of color complexes when certain additives are present, such as n-octadecyl 3-(3′,5′-di-tert-butyl-4′-hydrophenyl)propionate, a hindered phenolic primary antioxidant. This color complex formation imparts undesirable color to the polymeric particles to which the aqueous emulsions or dispersions are applied.

However, when such aqueous emulsions or dispersions contain sodium tetraborate, sodium carbonate, calcium carbonate, or magnesium carbonate, or a similar base component in the pH range >7 to ≦10.5, color complex formation is not observed. Such emulsions or dispersions containing sodium tetraborate can also contain additives such as stabilizers, for example, n-octadecyl 3-(3′,5′-di-tert-butyl-4′-hydroxyphenyl)propionate, without imparting color to the polymeric particles to which the aqueous emulsions or dispersions containing the additives are applied. The addition level of sodium tetraborate or a similar weak base to the aqueous emulsions or dispersions may vary from 0.2–1.0% by wt.

The aqueous emulsions or dispersions of this invention contain in addition to water, an emulsifiable wax, and the desired additives, stabilizers, colorants and the like.

The emulsifiable wax may be any wax which can be readily emulsified, for example, emulsifiable polyolefin waxes such as oxidized polyolefin waxes or modified polyolefin waxes. Preferred oxidized polyolefin waxes may be oxidized polyethylene wax having a density of 0.939, a melt viscosity of 250 cp at 125° C. and an acid number of 16; oxidized polyethylene wax having a density of 0.942, a melt viscosity of 900 cp at 125° C. and an acid number of 15; oxidized polyethylene wax having a density of 0.955, a melt viscosity of 250 cp at 125° C. and an acid number of 16; and maleated polypropylene wax having a density of 0.934, a melt viscosity of 400 cp at 190° C. and an acid number of 47.

The aqueous emulsions may contain an emulsifiable polyethylene wax having a density of 0.939, a melt viscosity of 250 cp at 125° C. and an acid number of 16. Such emulsions may also contain surfactants and emulsifiers such as commercially available Tergitol 15-S-15 [an ethoxylated linear alcohol having a hydrophylic-lypophilic balance of 15.4, as determined according to Griffin, W. C., Office. Dig. Federation Paint Varnish Prod. Blubs, 28, 446 (1956)], and anti-foam agents such as SWS-211 (a mixture of food grade emulsifiers, 10% by wt silicone compounds, and water). Such emulsions may also contain potassium hydroxide, sodium tetraborate, sodium carbonate, sodium bicarbonate, calcium carbonate or magnesium carbonate, morpholine, 2-amino-2-methylpropanol, tall oil fatty acid, ethylene glycol and ethoxylated stearyl alcohol [commercially available as Industrol A99], and the like.

Additives such as antioxidants, including, for example, hindered phenols, thioesters, organo-phosphites, and hindered amines, may readily be dispersed or emulsified in the aqueous emulsion system. Some preferred materials are octadecyl 3-(3′,5′-di-t-butyl-4-hydroxyphenyl)propionate or dilauryl thiodipropionate, tetrakis[methylene 3-(3′,5′-di-tert-butyl-4′-hydroxyphenyl)propionate]methane, 1,3,5-trimethyl-2,4,6-tris-(3,5-di-tert-butyl)-4-hydroxy-benzyl)benzene or bis(2,4-di-t-butylphenyl) pentaerythritol diphosphite, tris(-mono-nonylphenyl)-phosphite or 4,4′-butylidene-bis(5-methyl-2-t-butyl)phenol. The antioxidants may be used alone or in two- or more component emulsion systems for synergistic benefits. The various aqueous emulsions can be blended in various proportions to provide wide latitude in additive type and concentration levels for various end-use requirements.

Polymeric particles include, for example, polyolefins such as crystalline polypropylene, low density polyethylene, high density polyethylene and linear low density polyethylenes. Other polymeric materials include, for example, polystyrene, polyesters, polyamides and the like as well as copolymers such as crystalline propylene ethylene copolymers, rubbers such as ethylene propylene rubber and the like.

The present invention provides polymeric particles which are stabilized in a unique and efficient manner and which are free from undesirable color.

The invention will be further illustrated by the following examples although it will be understood that these examples are included merely for purposes of illustration and are not intended to limit the scope of the invention.

EXAMPLE 1

The emulsions used in the following examples are prepared as follows: The components of the emulsion including an emulsifiable wax, a base, a surfactant, and an additive and sufficient water for a solids content of about 60 to 80% are mixed in a glass-lined pressure vessel. While agitating the mixture, the temperature is raised, under pressure to prevent boiling, to a point sufficient to melt all solids and is maintained for a time period sufficient to ensure that the solids are melted (usually about 30 minutes). After this heating period while maintaining the pressure, hot water (85°–100° C.) is added in an amount sufficient to give a final solids content of about 25-60%. The emulsion is then reheated to the previous temperature and held at a pressure sufficient to prevent boiling at this temperature for a period of time to ensure homogeneity (usually about 10 minutes) followed by rapid cooling to ambient temperature (23° C.).

EXAMPLE 2

The following emulsion components were added to a pressure vessel: 32.3 parts by wt of octadecyl 3-(3',5'-di-t-butyl-4-hydroxyphenyl)propionate, 10.8 parts by weight of oxidized polyethylene emulsifiable wax, 0.5 parts of KOH as base, 6.4 parts of surfactant (Tergitol 15-S-15) and sufficient water was added to bring the content of the mixture at this stage to about 70% solids. The emulsion was then prepared according to the procedure in Example 1 with the final water addition being sufficient to make the total water content equal to 50% by wt of the mixture and the solids content of the mixture to 32% by wt of octadecyl 3-(3',5'-di-t-butyl-4-hydroxyphenyl)propionate in the total mixture. The resulting emulsion was applied to pellets of polypropylene having a density of 0.902 and a melt flow rate of 9. The amount of emulsion used was calculated to achieve a solids level of 0.3–0.5% solids by weight on the coated polypropylene pellets. The coated polypropylene pellets became a light yellow-green in color following air drying.

EXAMPLE 3

The following emulsion components were added to a pressure vessel: 32.3 parts by wt of octadecyl 3-(3',5'-di-t-butyl-4-hydroxyphenyl)propionate, 10.8 parts by weight of oxidized polyethylene emulsifiable wax, 0.5 parts of sodium tetraborate as base, 6.4 parts of surfactant (Tergitol 15-S-15) and sufficient water was added to bring the content of the mixture at this stage to about 70% solids. The emulsion was then prepared according to the procedure in Example 1 with the final water addition being sufficient to make the total water content equal to 50% by wt of the mixture and the solids content of the mixture to 32% by wt of octadecyl 3-(3',5'-di-t-butyl-4-hydroxyphenyl)propionate in the total mixture. The resulting emulsion was applied to pellets of polypropylene having a density of 0.902 and a melt flow rate of 9. The amount of emulsion used was calculated to achieve a solids level of 0.3–0.5% solids by weight on the coated polypropylene pellets. The coated polypropylene pellets did not exhibit a color shift from the original white color following air drying.

EXAMPLE 4

The following emulsion components were added to a pressure vessel: 30% by wt of an emulsifiable wax, 9% by wt of surfactant (Tergitol 15-S-15), 0.75% by wt of KOH, 0.25% by wt of sodium meta-bisulfite and sufficient water to bring the total solids content to 40%. While agitating the mixture under pressure to prevent boiling, the temperature was raised to a point sufficient to melt all solids and was maintained for thirty minutes to ensure that the solids were melted and was then rapidly cooled to ambient temperature. 25% by wt of the resultant emulsion was added to a one-gallon Ball-Mill, then 50% by wt of 1,3,5-trimethyl-2,4,6-tris(3,5-di-t-butyl)-4-hydroxybenzyl)benzene, 24.9% by wt of additional water and 0.1% by wt of an antifoaming agent (SWS 211) was added and the resultant mixture was ball milled for 16 hours. The final solids content of 1,3,5-trimethyl-2,4,6-tris(3,5-di-t-butyl)-4-hydroxy-benzyl)-benzene was 50% by wt of the total mixture. The resultant emulsion/dispersion was applied to pellets of polypropylene having a density of 0.902 and a melt flow rate of 9. The amount of emulsion/dispersion used was calculated to achieve a solids level of 0.3–0.5% solids by weight on the coated polypropylene pellets. The coated polypropylene pellets became a light purple-violet in color following air drying.

EXAMPLE 5

An emulsion/dispersion prepared according to Example 4 and substituting sodium tetraborate for potassium hydroxide as base was applied to pellets of polypropylene having a density of 0.902 and a melt flow rate of 9. The amount of emulsion/dispersion used was calculated to achieve a solids level of 0.3–0.5% solids by weight on the coated polypropylene pellets. The coated polypropylene pellets did not exhibit a color shift from the original white color following air drying.

EXAMPLE 6

(Comparative)

The following components were added to a pressure vessel: 32.3 parts by wt of tetrakis[methylene 3-(3',5'-di-t-butyl-4'-hydroxyphenyl)propionate]methane, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. An attempt was made to prepare an emulsion according to the procedure in Example 1. The final water addition was sufficient to make the total water content equal to 50% by wt of the mixture and the final solids content of the mixture to 32% by wt of tetrakis[methylene 3-(3',5'-di-t-butyl-4'-hydroxyphenyl)propionate]methane. The attempt to prepare the emulsion was unsuccessful due to the inability to coemulsify tetrakis[methylene-3',5'-di-t-butyl-4'-hydroxyphenyl)-propionate]methane with the oxidized polyethylene emulsifiable wax.

EXAMPLE 7

The following emulsion components were added to a pressure vessel: 11 parts by wt of tetrakis[methylene 3-(3'-5'-di-t-butyl-4'-hydroxyphenyl)propionate]methane, 21 parts by wt of dilauryl thiodipropionate, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. The emulsion was then prepared according to the procedure in Example 1 with the final water addition being sufficient to make the total water content equal to 50% by wt of the mixture and the solids content of the mixture to 32% by wt of tetrakis[methylene 3-(3'-5'-di-t-butyl-4'-hydroxyphenyl)propionate]methane and dilauryl thiodipropionate. A stable emulsion resulted.

EXAMPLE 8

The following emulsion components were added to a pressure vessel: 7.3 parts by wt of tetrakis[methylene 3-(3'-5'-di-t-butyl-4'-hydroxyphenyl)propionate]methane, 21 parts by wt of dilauryl thiodipropionate, 4 parts by wt of bis(2,4-di-t-butylphenyl)pentaerythritol diphosphite, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. The emulsion was then prepared according to the procedure in Example 1 with the final water addition being sufficient to make the total water content equal to 50% by wt of the mixture and the solids content of the mixture to 32% by wt of tetrakis[methylene 3-(3'-5'-di-t-butyl-4'-hydroxyphenyl)propionate]methane and dilauryl thiodipropionate and bis(2,4-di-t-butylphenyl)pentaerythritol diphosphite in the total mixture. A stable emulsion resulted.

EXAMPLE 9

The following emulsion components were added to a pressure vessel: 32.3 parts by wt of dilauryl thiodipropionate, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. The emulsion was then prepared according to the procedure in Example 1 with the final water addition being sufficient to make the total water content equal to 50% by wt of the mixture and the final solids content of the mixture to 32% by wt of dilauryl thiodipropionate in the total mixture. A stable emulsion resulted.

EXAMPLE 10

The following emulsion components were added to a pressure vessel: 9.6 parts by wt of tetrakis[methylene 3-(3'-5'-di-t-butyl-4'-hydroxyphenyl)propionate]methane, 16 parts by wt of dilauryl thiodipropionate, 6.4 parts by wt of tris(mononylphenyl)phosphite, 10.8 parts by weight of oxidized polyethylene emulsifiable wax, 0.5 parts of KOH as base, 6.4 parts of surfactant (Tergitol 15-S-15) and sufficient water to bring the content of the mixture at this stage to about 70% solids. The emulsion was then prepared according to the procedure in Example 1 with the final water addition being sufficient to make the total water content equal to 50% by wt of the mixture and the solids content of the mixture to 32% by wt of tetrakis[methylene 3-(3'-5'-di-t-butyl-4'-hydroxyphenyl)propionate]methane and dilauryl thiodipropionate and tris(mononylphenyl)phosphite in the total mixture. A stable emulsion resulted.

EXAMPLE 11

The following emulsion components were added to a pressure vessel: 8 parts by wt of tetrakis[methylene 3-(3',5'-di-t-butyl-4'-hydroxyphenyl)propionate]methane, 10.7 parts by wt of tris-(mononylphenyl)phosphite, 8 parts by wt dilauryl thiodipropionate, 13.2 parts by weight of oxidized polyethylene emulsifiable wax, 0.75 parts of KOH as base, and 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 60% by wt of the mixture and the solids content of the mixture to 23% by wt of tetrakis[methylene 3-(3',5'-di-t-butyl-4'-hydroxyphenyl)propionate]methane, tris(mononylphenyl)phosphite, and dilauryl thiodipropionate in the total mixture. A stable emulsion resulted.

EXAMPLE 12

The following emulsion components were added to a pressure vessel: 9 parts by wt of tetrakis[methylene 3-(3',5'-di-t-butyl-4'-hydroxyphenyl)propionate]methane, 12 parts by wt of tris(mononylphenyl)phosphite, 9 parts by wt dilauryl thiodipropionate, 10 parts by weight of oxidized polyethylene emulsifiable wax, 0.75 parts of KOH as base, 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 60% by wt of the mixture and the solids content of the mixture to 26% by wt of tetrakis[methylene 3-(3',5'-di-t-butyl-4'-hydroxyphenyl)propionate]methane, tris(mononylphenyl)phosphite, and dilauryl thiodipropionate in the total mixture. A stable emulsion resulted.

EXAMPLE 13

The following emulsion components were added to a pressure vessel: 9.6 parts by wt of tetrakis[methylene 3-(3',5'-di-t-butyl-4'-hydroxyphenyl)propionate]methane, 12.8 parts by wt of tris(mononylphenyl)phosphite, 9.6 parts by wt dilauryl thiodipropionate, 8 parts by weight of oxidized polyethylene emulsifiable wax, 0.75 parts of KOH as base, and 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 60% by wt of the mixture and the solids content of the mixture to 27% by wt of tetrakis[methylene 3-(3',5'-di-t-butyl-4'-hydroxyphenyl)propionate]methane, tris(mononylphenyl)phosphite, and dilauryl thiodipropionate in the total mixture. A stable emulsion resulted.

EXAMPLE 14

The following emulsion components were added to a pressure vessel: 10.3 parts by wt of tetrakis[methylene 3-(3',5'-di-t-butyl-4'-hydroxyphenyl)propionate]methane, 15.4 parts by wt of tris(mononylphenyl)phosphite, 10.3 parts by wt dilauryl thiodipropionate, 4 parts by weight of oxidized polyethylene emulsifiable wax, 0.75 parts of KOH as base, 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 60% by wt of the mixture and the solids content of the mixture to 31% by wt of tetrakis[methylene 3-(3',5'-di-t-butyl-4'-hydroxyphenyl)propionate]methane, tris(mononylphenyl)phosphite, and dilauryl thiodipropionate in the total mixture. A stable emulsion resulted.

EXAMPLE 15

(Comparative)

The following emulsion components were added to a pressure vessel: 8 parts by wt of tetrakis[methylene 3-(3',5'-di-t-butyl-4'-hydroxyphenyl)propionate]methane, 18.8 parts by wt dilauryl thiodipropionate, 13.2 parts by weight of oxidized polyethylene emulsifiable wax, 1.5 parts of KOH as base, and 6 parts of surfactant (Tergitol 15-S-15) and sufficient water to bring the solids content of the mixture at this stage to about 70% solids. The emulsion was then prepared according to the procedure in Example 1 with the final water addition being sufficient total water content equal to 69% by wt of the mixture and the solids content of the mixture 17% by wt of tetrakis[methylene 3-(3',5'-di-t-butyl-4'-hydroxyphenyl)propionate]methane and dilauryl thiodipropionate in the total mixture. A poor quality emulsion resulted.

EXAMPLE 16

The following emulsion components were added to a pressure vessel: 8 parts by wt of tetrakis[methylene 3-(3',5'-di-t-butyl-4'-hydroxyphenyl)propionate]methane, 18.8 parts by wt dilauryl thiodipropionate, 13.2 parts by weight of oxidized polyethylene emulsifiable wax, 0.75 parts of KOH as base, 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 69% by wt of the mixture and the solids content of the mixture 17% by wt of tetrakis[methylene 3-(3',5'-di-t-butyl-4'-hydroxyphenyl)propionate]methane and dilauryl thiodipropionate in the total mixture. A stable emulsion resulted.

EXAMPLE 17

(Comparative)

The following emulsion components were added to a pressure vessel: 30 parts by wt of octadecyl 3-(3',5'-di-t-butyl-4-hydroxyphenyl)propionate, 10 parts by weight of oxidized polyethylene emulsifiable wax, 0.2 parts of sodium tetraborate as base, 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 50% by wt of the mixture and the solids content of the mixture to 32.5% by wt of octadecyl 3-(3',5'-di-t-butyl-4-hydroxyphenyl)propionate in the total mixture. A poor quality emulsion resulted.

EXAMPLE 18

The following emulsion components were added to a pressure vessel: 30 parts by wt of octadecyl 3-(3',5'-di-t-butyl-4-hydroxyphenyl)propionate, 10 parts by weight of oxidized polyethylene emulsifiable wax, 0.4 parts of sodium tetraborate as base, 6 parts of surfactant (Tergitol 15-S-15) and sufficient water to bring the solids content of the mixture at this stage to about 70% solids. An aqueous emulsion was then prepared according to the procedure in Example 1 with the final water addition being sufficient to make the total water content equal to 50% by wt of the mixture, and the solids content of the mixture 32.5% by wt of octadecyl 3-(3',5'-di-t-butyl-4-hydroxyphenyl)propionate in the total mixture. A stable emulsion resulted.

EXAMPLE 19

The following emulsion components were added to a pressure vessel: 30 parts by wt of octadecyl 3-(3',5'-di-t-butyl-4-hydroxyphenyl)propionate, 10 parts by weight of oxidized polyethylene emulsifiable wax, 0.8 parts of sodium tetraborate as base, 6 parts of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 50% by wt of the mixture and the solids content of the mixture to 32.5% by wt of octadecyl 3-(3',5'-di-t-butyl-4-hydroxyphenyl)propionate in the total mixture. A stable emulsion resulted.

EXAMPLE 20

(Comparative)

Polypropylene pellets having a density of 0.906 and a melt flow rate of 4 were melt compounded with sufficient tetrakis[methylene 3-(3',5'-di-t-butyl-4'-hydroxyphenyl)propionate]methane, tris(mononylphenyl)phosphite, and dilauryl thiodipropionate to provide a stabilization level of 0.15%, 0.10%, and 0.25% by wt respectively to the polypropylene. Following extrusion and pelletization, the stabilized polypropylene was oven aged at 150° C. to check oxidative stability. The polypropylene had not exhibited evidence of degradation after 49 days at 150° C.

EXAMPLE 21

The following emulsion components were added to a pressure vessel: 8 parts by wt of tetrakis[methylene 3-(3',5'-di-t-butyl-4'-hydroxyphenyl)propionate]methane, 13.4 parts by wt of dilauryl thiodipropinate, 5.4 parts by wt of tris(mononylphenyl)phosphite, 13.2 parts by wt of oxidized polyethylene emulsifiable wax, 0.75 parts by wt of KOH as base, 6 parts by wt of surfactant (Tergitol 15-S-15) and sufficient water to bring the solids content of the mixture at this stage to about 70% solids. The emulsion was then prepared according to the procedure in Example 1 with the final water addition being sufficient to make the total water content equal to 50% by wt of the mixture and the solids content of the mixture to about 17% by wt of tetrakis[methylene 3-(3',5'-di-t-butyl-4'-hydroxyphenyl)propionate]methane, dilauryl thiodipropionate, and tris(mononylphenyl)phosphite. A stable emulsion resulted.

EXAMPLE 22

The emulsion of Example 21 was applied to polypropylene pellets having a density of 0.906 and a melt flow rate of 4 in a manner calculated to coat the polypropylene with 0.15%, 0.25%, and 0.10% by wt, respectively, of tetrakis[methylene 3-(3',5'-di-t-butyl-4'-hydroxyphenyl)propionate]methane, dilauryl thiodipropionate, and tris(mononylphenyl)phosphite. The coated polypropylene was oven aged at 150° C. to check oxidative stability. The polypropylene had not exhibited evidence of degradation after 49 days at 150° C. indicating that polypropylene stabilized with an aqueous emulsion of tetrakis[methylene 3-(3',5'-di-t-butyl-4'-hydroxyphenyl)propionate]methane, dilauryl thiodipropionate, and tris(mononylphenyl)phosphite compares favorably with polypropylene stabilized with the same compounds at the same level as in Example 20.

The invention has been described in detail with particular reference to preferred embodiments thereof, but it will be understood that variations and modifications can be effected within the spirit and scope of the invention.

We claim:

1. A method of applying additives to polymeric particles comprising contacting said particles with an aqueous system characterized by freedom from in situ formation of color producing complexes, said system comprising about 2 to about 10 percent by weight of a surfactant, about 5 to about 20 percent by weight of an emulsified wax, about 0.2 to about 1.0 percent by weight of a base with a pH in the range of greater than 7 to equal to or less than 10.5, about 20 to about 60 percent by weight of at least one additive capable of forming color producing complexes, and about 40 to about 60 percent by weight of water; and thereafter drying said particles.

2. The method of applying additives to polymeric particles according to claim 1 wherein said base is selected from sodium tetraborate, sodium carbonate, sodium bicarbonate, calcium carbonate or magnesium carbonate.

3. A method of applying additives to polymeric particles comprising contacting said particles with an aqueous emulsion which includes an emulsifiable wax, a first additive component which has a melting point of 100° C. or less and a second additive component which has a melting point greater than 100° C., wherein said emulsion is prepared by the method comprising (1) mixing, by weight, about 40 to about 65 percent water, about 12 to about 20 percent of said first additive component, about 4 to about 12 percent of said second additive component, about 5 to about 20 percent of an emulsifiable wax, about 0.2 to about 1.0 percent of a base, and about 2 to about 10 percent of a surfactant;

(2) while agitating the mixture, raising the temperature of the mixture sufficient to melt all solids;

(3) subsequently adding more water at a temperature of at least 85° C. in an amount to yield at least 25% solids;

(4) then reheating the mixture to a temperature sufficient to maintain the solids in a molten state;

(5) maintaining the heated mixture at said temperature and under pressure sufficient to prevent boiling for a period of time to ensure homogeneity;

(6) cooling said emulsion to ambient temperature; and thereafter drying said particles.

4. Polymeric particles treated by the method of claim 1.

5. Polymeric particles treated by the method of claim 2.

6. Polymeric particles treated by the method of claim 3.

* * * * *